United States Patent [19]

Garrett et al.

[11] 4,299,701

[45] Nov. 10, 1981

[54] MAGNETIC FLUID TREATING APPARATUS

[75] Inventors: Raymond K. Garrett; John G. Fifield, both of Billings, Mont.

[73] Assignee: Dynaflex, Billings, Mont.

[21] Appl. No.: 115,211

[22] Filed: Jan. 25, 1980

[51] Int. Cl.³ ............................................. B01D 35/06
[52] U.S. Cl. ..................................................... 210/222
[58] Field of Search ................................ 210/222, 223

[56] References Cited

U.S. PATENT DOCUMENTS

| | | | |
|---|---|---|---|
| 2,939,830 | 6/1960 | Green et al. | 210/222 |
| 3,539,509 | 11/1970 | Heitmann et al. | 210/222 |
| 3,555,475 | 1/1971 | Szczeponski | 210/222 |
| 3,567,026 | 3/1971 | Kolm | 210/222 |
| 3,841,486 | 10/1974 | Heitmann | 210/222 |
| 3,869,390 | 3/1975 | Heitmann | 210/222 |
| 3,873,448 | 3/1975 | Isberg et al. | 210/222 |
| 3,979,288 | 9/1976 | Heitmann et al. | 210/222 |

FOREIGN PATENT DOCUMENTS 1189888  4/1970  United Kingdom ................ 210/222

Primary Examiner—Theodore A. Granger
Attorney, Agent, or Firm—Price, Heneveld, Huizenga & Cooper

[57] ABSTRACT

A device for treating fluids passing therethrough with a pulsed DC magnetic field includes a cylindrical conduit of nonmagnetic material in which there is captively held a plurality of adjacently contacting solid ferromagnetic but unmagnetized spheres. At opposite ends and surrounding the cylindrical conduit is a pair of annular pole pieces made of a ferromagnetic material between which there is circumferentially wound an activating coil supplied with pulsed DC from a power supply. The interrupted DC field provides, in connection with the pole piece and spheres, a tortuous path through the treating device where the magnetic field is concentrated at the nodes defined by the pole pieces and the spheres through which the magnetic flux path is completed from pole piece to pole piece. In the preferred embodiment the device is employed for the magnetic treatment of water passing through the cylindrical conduit.

7 Claims, 4 Drawing Figures

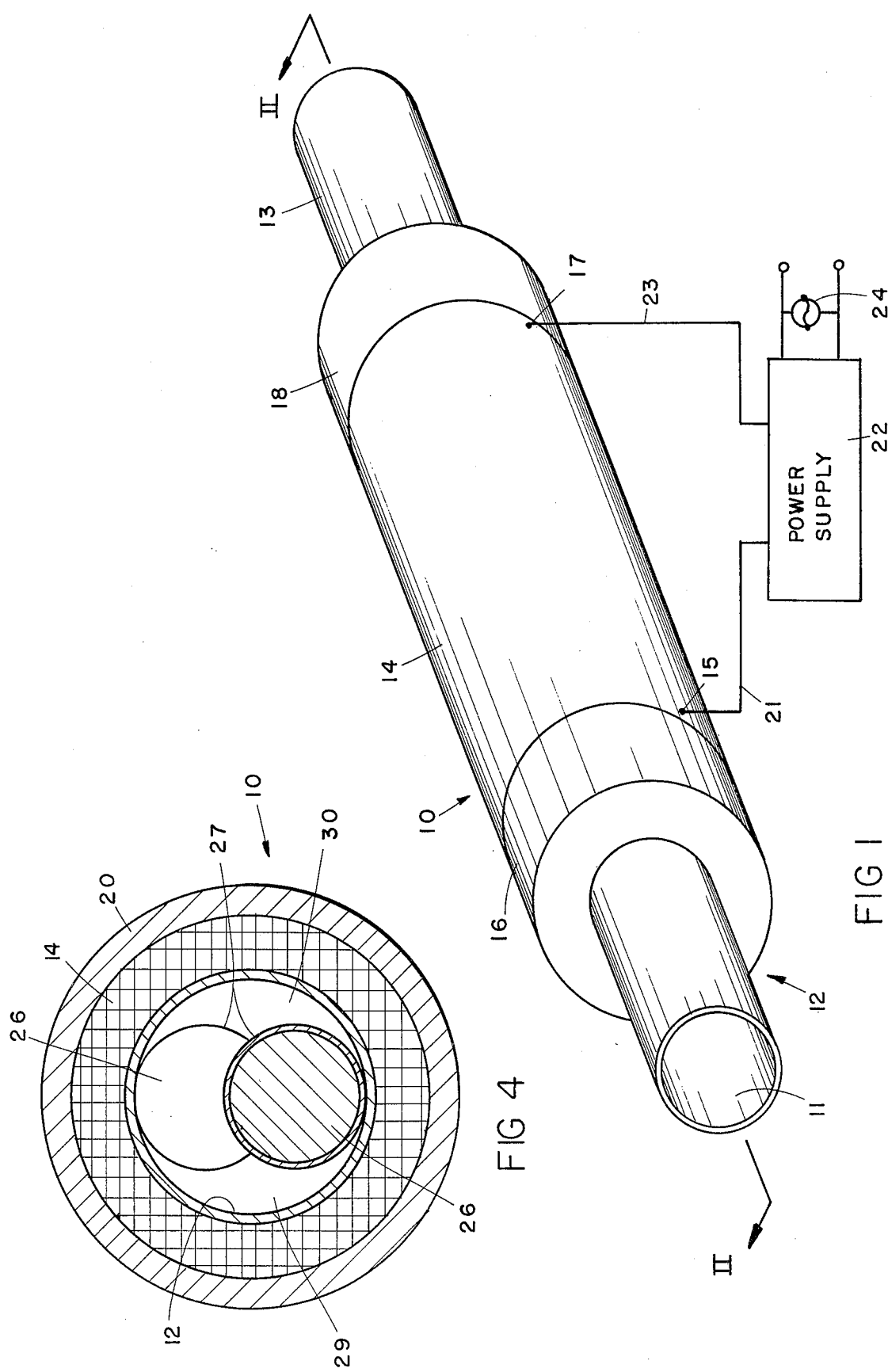

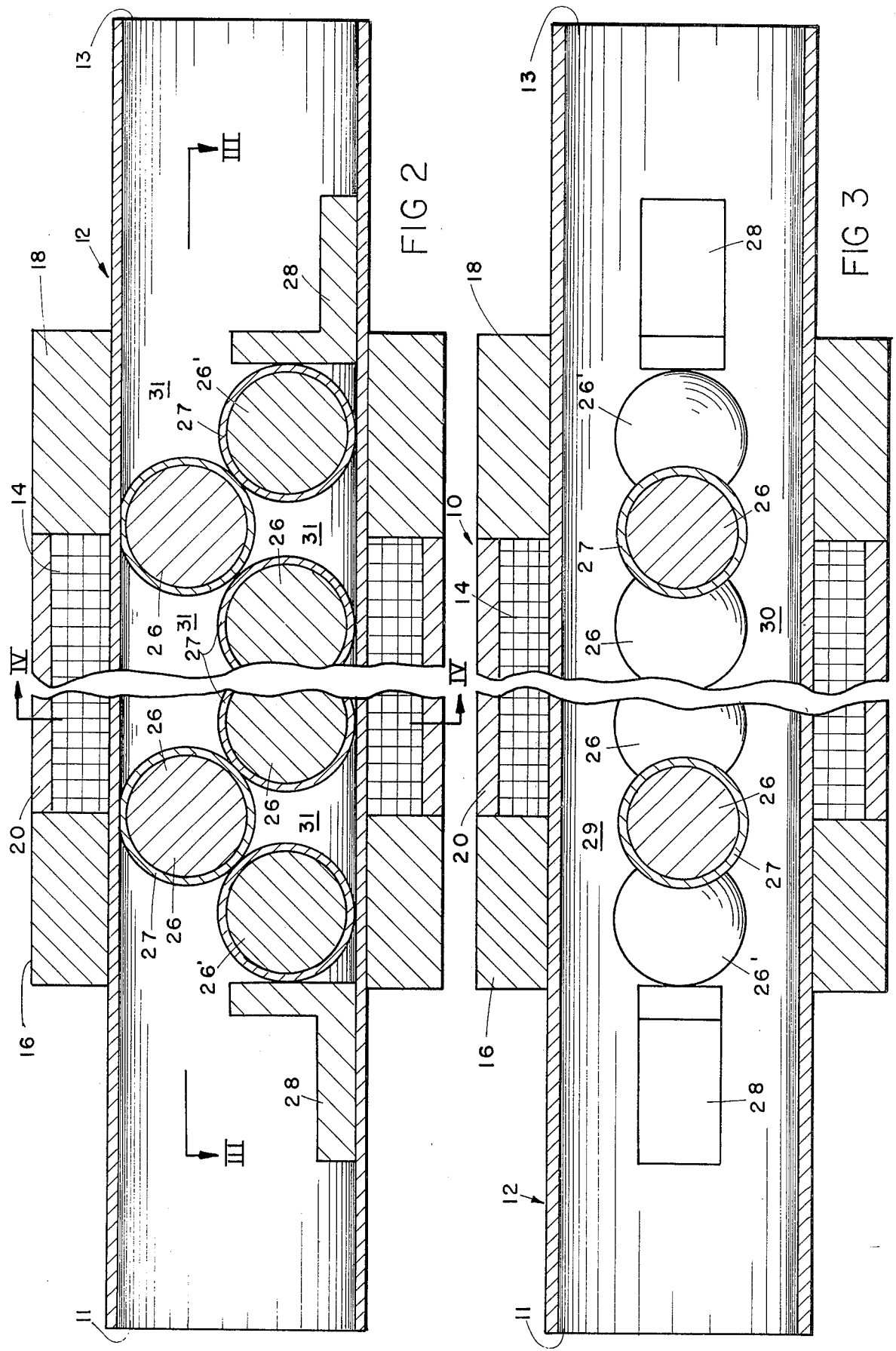

MAGNETIC FLUID TREATING APPARATUS

BACKGROUND OF THE INVENTION

The present invention relates to a magnetic fluid treatment apparatus particularly useful for the treatment of water.

Several devices have been proposed for the treatment of fluids and particularly liquids such as water utilizing concentrated magnetic fields. Representative of such devices are U.S. Pat. Nos. 3,923,660; 4,148,731; and 4,151,090. The utilization of magnetic fields for removing oxides from water and for other applications has also been suggested by U.S. Pat. Nos. 3,869,390; 3,979,228; 3,059,910; 2,943,739; 2,452,220; and Japanese Pat. No. 44-18798 (1969). In such prior art, typically a steady magnetic field is applied either by utilizing permanent magnets in the fluid flow path or by applying a direct current to an activating coil. Some of the patents suggest the utilization of steel balls to provide connection with the magnetic fields.

It has been suggested in a paper entitled, MAGNETIC TREATMENT OF WATER reproduced by the National Mechanical Information Service, U.S. Department of Commerce on Jan. 30, 1973 that the application of magnetic fields in the order of one hundred to one thousand oersteds is effective in preventing the formation of scales or incrustation in equipment, in the reduction of salt deposits, in the intensification of coagulation and crystalline processes, and other useful functions.

SUMMARY OF THE PRESENT INVENTION

The system of the present invention provides an improved magnetic fluid treating apparatus particularly adapted for utilization in the magnetic treatment of water and comprises a cylindrical conduit of nonmagnetic material surrounded by a pair of longitudinally spaced annular pole pieces made of a ferromagnetic material. Between the pole pieces there is provided an energizing coil circumferentially wound around the cylindrical conduit. Within the conduit adjacent to and between the pole pieces and thus within the magnetic field created by the coil when activated by a power supply, is a plurality of solid spheres made of a ferromagnetic material creating a tortuous fluid flow path through the device so formed and for concentrating the magnetic flux lines within the device.

In the preferred embodiment, the coil is activated by a pulsed DC current supply and the ferromagnetic spheres are either coated with a resin coating or nickel coated to resist deterioration. The provision of a plurality of tightly packed spheres provides a tortuous fluid flow path as well as nodes of concentration of the magnetic flux lines, which combined effect assists, in conjunction with the applied magnetic field, in the treatment of fluids passing through the device.

These and other features, advantages, and objects of the present invention will become apparent upon reading the following description thereof in connection with the accompanying drawings in which:

BRIEF DESCRIPTION OF THE DRAWINGS

FIG. 1 is a perspective view of a fluid treatment apparatus embodying the present invention;

FIG. 2 is an enlarged, fragmentary, longitudinal, vertical, cross-sectional view of the fluid treatment apparatus taken along section line II—II in FIG. 1;

FIG. 3 is an enlarged, fragmentary, longitudinal, horizontal, cross-sectional view of the fluid treatment apparatus taken along section line III—III in FIG. 2; and FIG. 4 is an enlarged axial vertical cross-sectional view of the fluid treatment apparatus shown in FIG. 1 taken along section line IV—IV of FIG. 2.

DETAILED DESCRIPTION OF THE PREFERRED EMBODIMENT

The magnetic fluid treating apparatus 10 of the present invention comprises a generally cylindrical conduit 12 having a fluid inlet 11 and a fluid outlet 13. Conduit 12 is made of a nonmagnetic material such as copper, PVC or the like. Coaxially surrounding the central portion of the conduit, as best seen in FIGS. 2 and 3, is a coil 14 wound in multiple layers of 16 gage copper magnet wire insulated by an enamel coating and extending axially in the preferred embodiment approximately seven and one-half inches along conduit 12. At either end of coil 14 and longitudinally spaced from each other is a pair of annular pole pieces 16 and 18 which fit tightly against the ends of coil 14 and have an internal diameter substantially equal to the external diameter of conduit 12. In the preferred embodiment, the pole pieces were made of iron and had an axially extending length of approximately three-quarters of an inch. Coaxially surrounding coil 14 in the preferred embodiment is an iron sleeve 20 which serves to enclose and protect coil 14 and provide a path for the magnetic field from coil 14 which is external to conduit 12. A pair of terminals 15 and 17 (FIG. 1) extend from opposite ends of coil 14 and serve as means for applying electrical power to the device from a power supply 22. Power supply 22 is coupled to a source 24 of 110 volt AC 60 Hz power and full wave rectifies such line voltage converting it to DC, pulsating at 120 Hz which is then applied to terminals 15 and 17 through conductors 21 and 23 respectively.

Within conduit 12 between pole pieces 16 and 18, there is provided a plurality of solid spheres 26 which are tightly packed as shown through FIGS. 2 through 4 and which are made of steel in the preferred embodiment although other ferromagnetic material could also be employed. The spheres have a diameter greater than one-half the inner diameter of conduit 12 so they can be alternately staggered as shown in FIG. 2. In the preferred embodiment of the invention, the spheres or balls 26 have a covering 27 which can be a coating or plating applied thereto for preventing deterioration such as corrosion or the like due to contact with the fluid passing through conduit 12. In the preferred embodiment, covering 27 was either a vinyl ester resin coating or the spheres or balls were nickel plated to provide the desired protection.

Spheres 26 are vertically aligned as shown in FIGS. 3 and 4 and tightly packed within the conduit such that alternate spheres contact an upper contact point along conduit 12 as seen in FIG. 2 while the remaining alternately staggered spheres contact the lower edge of the conduit. The end spheres 26 at opposite ends of the conduit are held in place either by a support elbow 28 or by bonding the endmost sphere to the conduit such that they compressively hold the remaining spheres in fixed position within the conduit and they remain stationary and centered between the pole pieces 16 and 18 and within the internal magnetic field of coil 14.

In one embodiment of the invention where the device is used with a three-quarter inch water line, conduit 12 was made of one-inch ID copper, and balls 26 had a diameter of 11/16's of an inch. Coil 14 constituted 405 turns with a DC resistance of 0.56 ohms. The peak current applied to the three layered coil by the 4.2 volt average DC power supply was 9.30 amperes and developed a peak field strength of 197 oersteds at the center of coil 14 according to the formula:

$$H = \frac{nI}{\sqrt{4r^2 + a^2}}$$

where H is the magnetic flux intensity in oersteds, n is the number of turns of coil 14, I is the current applied to the coil, r is the coil radius and a is the axial length of the coil (the coil dimensions being in centimeters).

For a one-inch water line, 11 balls of the same diameter were employed but coil 14 had 546 turns and was a six layer winding as opposed to the three layer winding. The DC resistance of such coil was 0.84 ohms while a 4.2 V average DC power supply 22 was used to provide a peak coil current of 7.0 amperes to develop a peak magnetic field strength of 283 oersteds.

For use in a one and one-half inch water line, a two inch ID copper conduit 12 was employed while nine balls having a one and one-quarter inch diameter were used. Coil 14 had 810 turns in a six layer winding. In this embodiment a power supply 22 was employed which provided a 10.02 volt average DC voltage to provide a peak coil current of 7.16 amperes to develop a peak field strength of 297 oersteds.

In use, the device is placed in series with the water supply line using suitable pipe fittings connected to the inlet 11 and outlet 13 of conduit 12. Power supply 22 is activated to continuously supply power to coil 14 although automatic shutoff means could be provided to activate coil 14 only when water is actually passing through the conduit 12. As can be appreciated, the tightly packed adjacent spheres 26 provide a tortuous fluid flow path through conduit 12 as can be seen in FIG. 4 where a pair of generally crescent-shaped passages 29 and 30 extend through conduit 12 and adjacent balls or spheres 26. The flow through conduit 12 naturally is turbulent such that the fluid also passes in the interstitial space 31 (FIG. 2) between adjacent spheres so as to be fully exposed to the magnetic field nodes existing about the tangential contact points of adjacent balls and the concentrated magnetic field extending between the pole pieces 16 and 18 and endmost balls 26' and their adjacent spheres 26. The positioning of the spheres as shown provides a magnetic flux pattern which is constantly changing direction and concentration within the conduit as well as intensifying at the opposite ends where pole pieces 16 and 18 are positioned. Also, the intensity of the magnetic field is varied at a frequency of 120 Hz due to the application of the full wave rectified 60 Hz AC voltage to coil 14 by power supply 22. Since the applied current is a pulsed DC current, the directional pattern of the field does not change in a polar sense once established by the placement of coil 14, pole pieces 16 and 18, and spheres 26.

It will become apparent to those skilled in the art that various modifications to and applications of the preferred embodiments of the invention described and disclosed herein can be made without departing from the spirit or scope of the invention as defined by the appended claims.

The embodiments of the invention in which an exclusive property or privilege is claimed are defined as follows:

1. A water treating apparatus comprising:
   a conduit of nonmagnetic material for the passage of water to be treated;
   a coil coaxial with and surrounding said conduit;
   a pair of pole pieces positioned in spaced relationship to one another at opposite ends of said coil,
   a plurality of ferromagnetic spheres each having a diameter greater than one-half the inner dimension of said conduit fixedly positioned in said conduit in the space surrounded by said coil and adjacent said pole pieces, said spheres positioned in alternately staggered relationship to define a tortuous fluid flow path through said conduit; and
   power supply means coupled to said coil for providing pulsed DC current to said coil such that an interrupted magnetic field is provided with nodes at said pole pieces and said spheres to treat water passing through said conduit.

2. The apparatus as defined in claim 1 wherein said conduit is cylindrical.

3. The apparatus as defined in claim 2 wherein said pole pieces are annular and coaxially surround said conduit and wherein said apparatus further includes a ferromagnetic sleeve surrounding said coil and extending between said pole pieces.

4. The apparatus as defined in claim 3 wherein said spheres are solid and include a protective outer covering.

5. The apparatus as defined in claim 4 wherein said protective covering is a resin coating.

6. The apparatus as defined in claim 4 wherein said protective covering is an outer plating of nickel.

7. The apparatus as defined in claim 1 wherein said power supply provides pulsating DC current to said coil at a rate approximately twice the line frequency.

* * * * *